United States Patent [19]

Copes

[11] Patent Number: 5,260,125
[45] Date of Patent: Nov. 9, 1993

[54] CERAMIC COMPOSITE OF ALUMINOBOROSILICATE FIBERS COATED WITH SEVERAL LAYERS

[75] Inventor: Jane S. Copes, Inver Grove Heights, Minn.

[73] Assignee: Minnesota Mining and Manufacturing Company, St. Paul, Minn.

[21] Appl. No.: 684,317

[22] Filed: Apr. 12, 1991

[51] Int. Cl.⁵ .................. B32B 17/02; B32B 18/00
[52] U.S. Cl. .................. 428/285; 428/408; 501/89; 501/95
[58] Field of Search .......... 501/89, 95; 428/408, 428/367, 284, 285

[56] References Cited

U.S. PATENT DOCUMENTS

| | | | |
|---|---|---|---|
| 4,072,530 | 2/1978 | Hirame et al. | 501/89 |
| 4,148,962 | 4/1979 | Leiser et al. | 428/366 |
| 4,358,500 | 11/1982 | George et al. | 428/246 |
| 4,507,355 | 3/1985 | George et al. | 428/246 |
| 4,563,219 | 1/1986 | George et al. | 106/287.19 |
| 4,592,966 | 6/1986 | Prior et al. | 428/689 |
| 4,617,232 | 6/1986 | Chandler et al. | 428/408 X |
| 4,650,775 | 3/1987 | Hill | 501/95 |
| 4,711,666 | 12/1987 | Chapman et al. | 106/14.12 |
| 4,735,850 | 4/1988 | Eitman | 501/95 X |
| 4,755,489 | 7/1988 | Chyung et al. | 501/95 X |
| 4,769,074 | 9/1988 | Holcombe, Jr. et al. | 106/14.12 |
| 4,772,395 | 9/1988 | Tungatt et al. | 210/506 |
| 4,861,410 | 8/1989 | Clark et al. | 156/325 |

*Primary Examiner*—William R. Dixon, Jr.
*Assistant Examiner*—Lisa N. Schull
*Attorney, Agent, or Firm*—Gary L. Griswold; Walter N. Kirn; Gregory D. Allen

[57] ABSTRACT

A coating composition for use with ceramic composites to reduce gas permeability of the composites as well as provide an adhesive force to the composites. The composite contains a base fabric of aluminoborosilicate fibers coated with first a carbonaceous layer, followed by a layer of silicon carbide, and a layer of a mixture of silicon carbide, aluminum phosphate, and aluminoborosilicate particles.

5 Claims, No Drawings

CERAMIC COMPOSITE OF ALUMINOBOROSILICATE FIBERS COATED WITH SEVERAL LAYERS

FIELD OF THE INVENTION

This invention relates to a ceramic coating for high-temperature silicon carbide ceramic composites used in gas-fired radiant burner tubes, gas burner nozzle liners, heat exchangers, and other furnace components. The ceramic coating of the present invention substantially matches the thermal expansion coefficient of the composites, thus resulting in a gas-impermeable composite that still maintains its toughness. The invention also relates to using the ceramic coating to bond ceramic composites together.

BACKGROUND OF THE INVENTION

Furnace components such as radiant burner tubes must be able to withstand high temperatures and corrosive environments in industrial heat-treating and in aluminum melting furnaces. Commercially-available burner tubes operate in the range from about 900° C. to about 1250° C. and are generally metal alloy tubes, ceramic monolith tubes, and ceramic composite tubes. Of the first type, nickel-based superalloy metal tubes are commonly used, but are limited to the lower temperature range of 900°-1100° C. Of the second type, monolithic silicon carbide radiant burner tubes are commonly used and generally have temperature capabilities up to about 1250° C. but suffer from the brittle failure problems typical of monolithic ceramic shapes. Furnace components, used in very high temperatures and in corrosive environments, require a special selection of materials to avoid chemical and mechanical disintegration of the ceramic. Ceramic-ceramic composites, using ceramic fibers and cloths as reinforcements in a ceramic matrix, are the third type of tube and are frequently the most desirable choice for use in high temperature, chemically-corrosive environments.

One type of commercially-available radiant burner tube is produced under the designation SICONEX TM Fiber-Reinforced Ceramic, and is commercially available from Minnesota Mining and Manufacturing Company, St. Paul, Minn. SICONEX TM Fiber-Reinforced Ceramic is a ceramic-ceramic composite comprising aluminoborosilicate fibers in a silicon carbide matrix. SICONEX TM Fiber-Reinforced Ceramic is prepared by first forming a tube or other shape of NEXTEL TM aluminoborosilicate ceramic fibers (commercially available from Minnesota Mining and Manufacturing Company, St. Paul, Minn.) by braiding, weaving, or filament-winding the ceramic fibers. The ceramic fiber shape is treated with a phenolic resin to rigidize it, and then coated via chemical vapor deposition at temperatures ranging from 900° to 1200° C. to produce a relatively impermeable, chemically-resistant matrix of a refractory material such as beta-silicon carbide. The resultant rigid ceramic composite is then useful at high temperatures and in corrosive environments.

However, the utility of these materials as furnace components can, depending on the degree of their permeability to gases, be somewhat limited. Ceramic-ceramic composites such as SICONEX TM are comprised of relatively open networks of fibers and can remain permeable to gases, even after extensive overcoating with a ceramic (e.g., silicon carbide) layer.

While there have been many approaches to sealing ceramic composite surfaces, these attempts have not been coupled with sufficient matching of chemical, thermal, and mechanical properties of the coating to achieve adequate thermal and chemical behavior at extreme temperatures and reaction conditions. Thermal expansion coefficient matching is especially critical due to the elevated temperatures of use and repeated thermal cycling in typical furnace applications.

Previous work in this field generally is directed to coating, sealing, or adhering refractory materials. U.S. Pat. No. 4,358,500 and related U.S. Pat. No. 4,563,219 describe a composition for bonding refractory materials to a porous base fabric such as fiberglass, using a coating comprised of colloidal silica, monoaluminum phosphate, and aluminum chlorohydrate. The coating provides heat and flame protection to the fiberglass fabric.

U.S. Pat. No. 4,507,355 describes an inorganic binder prepared from colloidal silica, monoaluminum phosphate, aluminum chlorohydrate and a catalyst of alkyl tin halide. This mixture is applied to the preferred substrate fiberglass to form a heat-resistant fabric.

U.S. Pat. No. 4,592,966 teaches a method of strengthening a substrate (fiberglass or fiberglass composites) by impregnating the substrate with, for example, aluminum or magnesium phosphate, magnesium oxide, or wollastonite, and a non-reactive phosphate. This is described as a cement which lends strength to the fiber substrate.

U.S. Pat. No. 4,650,775 describes a thermally-bonded fibrous product wherein aluminosilicate fibers are bonded together with silica powder and boron nitride powder. These mixtures can be formed into different shapes and used as diesel soot filters, kiln furniture, combustor liners, and burner tubes.

U.S. Pat. No. 4,711,666 and related U.S. Pat. No. 4,769,074 describe an oxidation prevention coating for graphite. A binder/suspension of colloidal silica, monoaluminum phosphate and ethyl alcohol is applied to a graphite surface and prevents oxidation during heat cycling U.S. Pat. No. 4,861,410 describes a method of joining a metal oxide ceramic body such as alumina with a paste of a sol of a metal oxide, aluminum nitrate and silicon carbide. This method is used to repair cracks in ceramic materials and to permanently join ceramic structures together.

Silicon carbide-ceramic fiber composites would benefit greatly from a coating that would protect the composites in high temperature and corrosive environments. To be most effective for high temperature uses, the coating needs to match the thermal expansion coefficient of the composite. In uses which require minimal transfer of gases through the wall, the coating needs to reduce the permeability of the silicon carbide-ceramic fiber composite. A further need in this field is the ability to adjoin ceramic composite pieces together or to patch holes in the composite articles.

To date, there has not been a coating composition which matches the thermal expansion coefficient of an aluminoborosilicate fiber-silicon carbide-coated composite under high temperature conditions, limits gas permeability and can be used to adjoin the aforementioned composites together. The increased use of ceramic composites in high temperature and corrosive environments creates a need for a coating composition with the above attributes.

SUMMARY OF THE INVENTION

An impermeable, ceramic-ceramic composite is formed by coating a silicon carbide coated composite of aluminoborosilicate fibers with a ceramic precursor coating comprised of an aqueous suspension of an aluminum phosphate precursor, flakes or chopped fibers of aluminoborosilicate and silicon carbide powder, flakes, or fibers. The term "impermeable" is meant to denote a coating which is substantially impermeable to gases passing through the coating. The coating can be applied by spraying, dipping, or brushing. The coating is dried in air and then fired to form a hard and durable coating.

By application of this coating, the strength of the ceramic composite, as measured by internal pressurization to failure, is equal to or slightly higher than that of an uncoated composite tube. This behavior is an important indicator of the composite character of the final coated structure. It is particularly desirable to avoid firing or reacting composite materials to a point at which the composite actually takes on the characteristics of a monolithic structure. In a practical sense, the result of monolithic behavior is a dramatically increased brittleness of the material; hence, monolithic structures are dramatically less effective for uses which subject the material to mechanical stress. A ceramic composite having the coating of the present invention results in a tough structure and not a monolithic structure. The coating may also be used as a bond coating which secures two ceramic substrates, particularly tubes, together.

DETAILED DESCRIPTION OF THE INVENTION

In accordance with this invention, silicon carbide ceramic composites are coated with an aqueous suspension of monoaluminum phosphate ($Al(H_2PO_4)_3$, flakes or chopped fibers of aluminoborosilicate, and silicon carbide powder. The coating is most easily applied by brushing it onto the composite surface, although other application methods, such as dip coating or spraying, could be used. Once the coating is applied to the composite, it is allowed to air dry, and then fired to about 1000° C. to form a hard and durable ceramic coating.

There are many silicon carbide ceramic composites which could be used in conjunction with the coating compositions of the present invention. One brand of composite is the afore-mentioned SICONEX TM Fiber-Reinforced Ceramic, commercially-available from Minnesota Mining and Manufacturing Company, St. Paul, Minn. These composites are formed by first braiding, weaving, or filament-winding fibers of aluminoborosilicate (sold under the trade designation NEXTEL TM 312, having an alumina:boria mole ratio of from 9:2 to 3:1.5 and containing up to 65 weight percent silica, as described in U.S. Pat. No. 3,795,524, assigned to Minnesota Mining and Manufacturing Company) to form a desired shape, such as a tube. The tube is coated with a phenolic resin in an organic solvent to rigidize it and thereafter coated with silicon carbide via chemical vapor deposition.

The coating of the present invention is comprised of silicon carbide, aluminum phosphate and aluminoborosilicate. An available source of silicon carbide is available as fine abrasive powder, commercially available from Fujimi Kenzamaki Kogyo Co., Inc., Nagoya, Japan. Other forms of silicon carbide include flakes or fibers. In the preferred embodiment, 1–50 micrometer diameter silicon carbide powder is used.

The precursor aluminum phosphate present in the coating is prepared by dissolving aluminum metal in phosphoric acid. A solution, 50 weight percent of $Al(H_2PO_4)_3$ in water, is available from Stouffer Chemical Company, Westport, Conn. As the coating is fired, water and a portion of phosphate are released from the aluminum phosphate solution. Thus, aluminum phosphate is left after firing. The mole ratio of silicon carbide to aluminum phosphate ($SiC:AlPO_4$) in the fired coating is preferably in the range of about 1:1 to 50:1. Most preferably, the mole ratio of $SiC:AlPO_4$ in a fired coating is in the range of about 5:1 to 30:1.

Aluminoborosilicate is also added to the coating composition. This may be in the form of powder, flakes or fibers. Preferably, aluminoborosilicate, in the form of fibers, is used and is available under the trade designation NEXTEL TM Ceramic Fiber, commercially available from Minnesota Mining and Manufacturing Company. The ceramic fiber yarn ranges in diameter from 11 to 15 micrometers and is chopped by passing the yarn between two steel rollers with knurled surfaces. Other methods of chopping include ball milling or other methods known in the art. The yarn is chopped to an average fiber length of about 0.02 to 0.05 mm. The weight percent of the aluminoborosilicate of the total coating composition is in the range of about 0.5 to 70% and, preferably, in the range of about 30 to 70%.

To fashion the ceramic composites for testing the different coating compositions of the present invention, NEXTEL TM Ceramic Fiber braid was fit onto a 5 cm diameter aluminum mandrel, and a solution of 10 ml of phenolic resin (DURITE TM SC-1008 phenolic resin, 60–64% solids, commercially available from Borden Chemical, Columbus, Ohio) in 90 ml of methanol was prepared. A small amount of the resin solution was poured over the ceramic fiber tube while rotating the mandrel, to assure uniform coverage by the resin. The tube was then dried in air until solvent odor could no longer be detected, and then cured in air at 200° C. for 20 minutes. This process resulted in a rigid tube having a golden color due to the cured polymer layer.

The rigid preform was placed in a chemical vapor deposition chamber, as is well known in the art, wherein vacuum is applied and the chamber is heated. Hydrogen gas was bubbled through dimethyldichlorosilane (DDS) and passed through the CVD furnace chamber, thermally decomposing the DDS which thereby deposited a layer of silicon carbide on the preform. By-product and unreacted gases exited the opposite end of the tube to the vacuum pumping and scrubbing system. Typical process conditions for these samples were pressures of 5 to 50 torr, flow rates of 0.15 liters per minute(lpm) of DDS, and 1.0 lpm of hydrogen gas at temperatures of 900° to 1000° C. Coating times ranged from 4 to 8 hours. Under these process conditions and times, the samples received from about 100 to about 200 weight percent increase due to silicon carbide deposition. In this process, SiC coats and infiltrates the fibers and the resin coat is also decomposed to form a carbonaceous layer on the surface of the preform. It is useful to examine the fractured surfaces of broken composites made in the above manner. The fractured surfaces resulted in a "brushy" fracture surface which indicates that the coated material has composite rather than monolithic properties, and that heating and processing steps have not destroyed the desired composite properties.

Coupons of SICONEX ™ Fiber-Reinforced Ceramic were prepared in a manner similar to the tubes, using woven ceramic fiber (NEXTEL ™ ,312) fabric. Coupons were convenient for carrying out initial studies of coating feasibility and were more convenient to use in order to examine the adhesion and hardness of the coating. Adhesion of the coating on an exposed edge and the performance of the coated edge are also important indicators of the coating performance.

Many sizes of tubes of the ceramic-ceramic composite were coated and tested. Permeability of the final fired tubes was tested by a differential flow test using a flow meter.

Though not being bound by theory, it is believed that the coating works to maintain the composite characteristics of its composite substrate as well as to match the thermal expansion coefficient of the substrate (which is important in furnace and high temperature applications) because the coating itself is a composite material, being comprised of flakes or fibers and particles in a matrix. The flakes, fibers, and particles act to fill the porous sites in the matrix, thereby blocking the flow of gas through the porous sites. Further, this discontinuous phase also deflects cracks that may initiate in the coating from mechanical or thermal stresses.

EXAMPLE 1

Aluminoborosilicate (NEXTEL ™ 312 ceramic fiber commercially-available from Minnesota Mining and Manufacturing Company, St. Paul, Minn.) ranging in diameter from 11 to 15 micrometers was chopped by passing the ceramic fiber yarn between two steel rollers with knurled surfaces. This resulted in chopped fibers with an average length of about 50 micrometers.

To a 50 percent by weight solution of monoaluminum phosphate, $(Al(H_2PO_4)_3$, commercially available from Stauffer, Westport, Conn.) was added silicon carbide powder (#1500, 8 micron, commercially available from Fujimi Kenmazai Kogyo Co., Ltd., Nagoya, Japan) and chopped NEXTEL ™ 312 ceramic fiber. Deionized water was added to some mixtures to adjust the consistency for coatability. Table I shows compositions representing approximately 40–70% fired solids and mole ratios of SiC to $AlPO_4$ in the fired product of from about 5 to about 20:1.

TABLE I

| | COATING COMPOSITIONS | | | |
|---|---|---|---|---|
| | component | mass, g | moles SiC:AlPO$_4$ | % fired solids |
| a. | Al(H$_2$PO$_4$)$_3$ | 2.9 | 6 | 40 |
| | SiC powder | 1.1 | | |
| | NEXTEL ™ fiber | 1.3 | | |
| | deionized water | 2.0 | | |
| b. | Al(H$_2$PO$_4$)$_3$ | 45.0 | 6 | 50 |
| | SiC powder | 16.3 | | |
| | NEXTEL ™ fiber | 11.4 | | |
| | deionized water | — | | |
| c. | Al(H$_2$PO$_4$)$_3$ | 50.0 | 6 | 55 |
| | SiC powder | 18.1 | | |
| | NEXTEL ™ fiber | 21.7 | | |
| | deionized water | — | | |
| d. | Al(H$_2$PO$_4$)$_3$ | 5.0 | 16 | 69 |
| | SiC powder | 5.0 | | |
| | NEXTEL ™ fiber | 5.0 | | |
| | deionized water | 1.0 | | |
| e. | Al(H$_2$PO$_4$)$_3$ | 1.5 | 20 | 47 |
| | SiC powder | 1.9 | | |
| | NEXTEL ™ fiber | 1.9 | | |
| | deionized water | 4.0 | | |

Tube-shaped SICONEX ™ Fiber-Reinforced Ceramic samples were dipped in, or painted with, each coating formulation, typically in only one pass. Coated parts typically weighed 10 to 20% more than the weight of the original part and had a coating thickness of about 1 mm. The coated parts were allowed to dry at ambient temperature and humidity for 24 hours and then were fired in air by ramping the temperature at 250° C. per hour to 1000° C., and holding for 1 hour. The coatings were hard and durable as indicated by attempting to remove or crack the coating by scratching the surface with a steel needle. Intact ceramic fibers and particles of SiC could be seen by examination under a microscope at 50× magnification. X-ray diffraction powder patterns of the fired coatings showed beta-SiC, mullite, and AlPO$_4$ as crystalline phases.

EXAMPLE 2

In order to test the permeability of a sample before and after coating, tube-shaped samples were used. Through-wall permeability of two tubes (5.0 cm outer diameter × 20.0 cm long) was measured by closing each end of the tube with a one-hole stopper, and flowing air through the tube. Air at a regulated pressure of 1 atmosphere (1.03 Kg/cm$^2$) was admitted through a needle valve and monitored by a flow meter at the inlet end of the tube. A manometer at the exit end of the tube measured the difference in pressure between the inside of the tube (pressurized air flowing through it) and the outside of the tube (room pressure). For a particular pressure drop, the air flow in cm$^3$/min is read from the flow meter. This flow rate, divided by the surface area of the tube, is permeability (cubic centimeters per minute per square centimeter).

A coating of 55 weight percent fired solids and a 6:1 SiC:AlPO$_4$ mole ratio (as per Example 1c) was applied to the outside surface of the tubes. The wet coating was 12 to 15% of the original part weight. After air drying, the tubes were fired to 1000° C. The tubes were weighed and permeability checked again. Table II shows weight and permeability changes:

TABLE II

| | PERMEABILITY DATA | | | | |
|---|---|---|---|---|---|
| | weight (gm) | | | permeability (cm$^3$min$^{-1}$cm$^{-2}$) | |
| tube | uncoated | coated & fired | % wt. gain | uncoated | coated & fired |
| 1 | 77.62 | 85.19 | 9.8% | 132.0 | 1.2 |
| 2 | 95.80 | 103.86 | 8.6 | 10.2 | <.02 |

Gas permeability was reduced by a factor of approximately 100 for tube 1 and a factor of 500 for tube 2.

EXAMPLE 3

Two 5.0×20.3 cm SICONEX ™ Fiber-Reinforced Ceramic composite tubes were coated as described in Example 1 with the coating formulation of Example 1c (designated A in Table III, below), and two tubes with no coating (designated B in Table III) were fired together to 1000° C. for 1 hour. All tubes were cut into 2.5 cm long rings in order to do strength testing.

Additional samples were prepared to evaluate the coating as an edge protector for SICONEX ™ Fiber-Reinforced Ceramic. Three 15.2 cm (6") samples were cut from one 5.1 by 45.7 cm (2"×18") tube and treated as follows Sample C (ends of 15.2 cm piece coated, heat treated to 1250° C. for 10 hours), Sample D (cut into 1" samples, cut edge coated, heat treated at 1250° C. for 10 hours), and Sample E (cut into 1" samples, heat treated at 1250° C. for 10 hours).

Burst strength was measured on 1" rings from all tubes by internal pressurization to failure (burst test); average results of the samples are shown in Table III.

TABLE III

| | STRENGTH DATA | | |
|---|---|---|---|
| | treatment 1000° C., 1 hr. | burst strength average | st. dev. |
| A | coated | 9420 psi | 540 |
| B | uncoated | 9230 | 1470 |
| | 1250° C., 10 hr. | | |
| C | HT. as piece, cut | 8000 | 920 |
| D | cut, edge coated, HT. | 6840 | 1080 |
| E | cut, no coating. HT. | 5420 | 670 |

In comparing Samples A and B, the burst strength of the samples shows some improvement after coating.

In the data for Sample C (15 cm-long sample, heated, sectioned, and tested) and E (six 2.5 cm ring samples, heated, and tested), it appeared that cutting samples before heat treating resulted in a loss of strength of about 33% with uncut samples. Cut samples which were also edge-coated (Sample D) suffered only about a 15% strength loss. Fracture surfaces of Samples C and D are "brushy" (meaning individual fibers are visible and have not fused together during heat treatment) and composite-like, while fractured samples of E were quite brittle with less evidence of fiber pull-out. Although not intending to be held to any theory, it is speculated that unprotected edges allow oxygen to penetrate into the interface between fibers and the matrix. Oxidation within the matrix is suspected to result in bonding between the fibers and the matrix and, thus, brittle fracture behavior results.

EXAMPLE 4

Three coating formulations were prepared as described in Example 1 with the formulation of Example 1d, except that the particle size of the SiC was varied. The particle sizes were one micron, 8 micron, and 50 micron SiC powders, commercially available from Fujimi Kenmazai Kogyo Co. Ltd., Nagoya, Japan. Small SICONEX ™ Fiber-Reinforced Ceramic composite samples were painted with the coatings and fired first to 1000° C. for a period of one hour at a heat-up rate of 250° C./hour and then to 1200° C. for a period of one hour. Each sample was hard and durable as indicated by visual inspection after attempting to remove or crack the coating by scratching the surface with a steel needle. Thus, a wide range of silicon carbide particle sizes and a wide firing temperature range produce acceptable coatings.

EXAMPLE 5

This example shows how the coating compositions can be used as adhesives to join two samples together. To test for shear strength of the coating when used as a bonding agent, 2.5 cm-long SICONEX ™ Fiber-Reinforced Ceramic tubes of two different diameters were used (5 cm and 4.4 cm in outer diameter).

The tubes were joined together by fitting the smaller diameter tube part-way into the larger tube, such that the smaller diameter tube projected 1.25 cm out of the larger diameter tube. A 1.25 cm band of coating (70 weight% solids) was placed on the outer surface of the smaller tube, and then a 1.25 cm wide piece of NEXTEL ™ 312 ceramic fiber tape was placed on the coating. Additional coating was added to the tape, and then the tube with the coating and the ceramic fiber tape was fitted into the larger tube.

Additional coating was added to fill the gap between the two tubes. This bonded piece was dried for 24 hours at ambient temperature and humidity, heated for 10 hours at 110° C., and fired for 2 hours at 1000° C.

An axial compression test of the joined tubes was carried out. In this test, pressure was applied to the long axis of the joined tubes to try to break the adhesive bond formed by the dried and fired coating between the two tubes. Axial compression tests of fired tubes were carried out at 0.051 cm/min (0.02"/min) crosshead speed with an Instron Model 1125 load frame. Joints tested in this way did not fail under a 1000 lb. (455 Kg) load at room temperature. This indicates that the coating can be used effectively to join SICONEX ™ Fiber-Reinforced Ceramic composite tubes together. This is useful for making T- or U-shaped tubes, or for cases in which the tube diameter must change in order to fit another piece.

A further test of the bonding strength of the coating was to rapidly cycle joined pieces through a heating and cooling sequence. Two 5-cm long by 4.4 cm diameter SICONEX ™ Fiber-Reinforced Ceramic composite tubes were butt-joined using the coating composition prepared as described above. An outer sleeve of 5 cm diameter and 2.5 cm long was added at the joint to further reinforce the butt-joint. The assembled tube was dried and fired as described above. The joined tubes were flame-cycle tested by heating the inside of the joined tubes with the gas flame of a Meeker burner to a temperature of approximately 800° C. while cooling the outside of the tube with a flow of compressed air. These heat cycles did not cause failure of the bonds. Further heating of this heat-cycled joint for 100 hours at 1000° C. in air caused no detectable strength change.

EXAMPLE 6

In order to show utility of the coating formulations as an adhesive for patching SICONEX ™ composite parts together, a coating with 70 weight % solids was applied by brushing it onto a SICONEX ™ composite tube, drying in air for several hours, and firing with a gas-air torch of the kind typically used for glass working. Components of the coating melted slightly, lightened in color, and then hardened.

The coating is, thus, effective in attaching a patch to a SICONIX ™ Fiber-Reinforced Ceramic composite tube with a hole in it or in bridging small gaps or cracks in SICONIX ™ Fiber-Reinforced Ceramic composite tubes in situations where the tubes are in need of repair and require spot heat-treating.

As will be apparent to those skilled in the art, various other modifications can be carried out for the above disclosure without departing from the spirit and scope of the invention.

What is claimed is:

1. A fired ceramic composite comprising:
   (a) a base fabric of aluminoborosilicate fibers;
   (b) a carbonaceous layer coated on said base fabric;
   (c) a silicon carbide layer coated over said carbonaceous layer; and
   (d) a mixture comprising silicon carbide and aluminum phosphate having a molar ratio of silicon carbide to aluminum phosphate in the range of about 1:1 to 50:1 and aluminoborosilicate particles in the weight range of about 0.5 to 70 weight percent of the total mixture, coated over said silicon carbide layer.

2. The ceramic composite of claim 1 wherein said aluminoborosilicate particles are chopped fibers.

3. The ceramic composite of claim 1 wherein said aluminoborosilicate particles are flakes.

4. The ceramic composite of claim 1 wherein said silicon carbide and aluminum phosphate molar ratio is in the range of about 5:1 to 30:1.

5. The ceramic composite of claim 1 wherein said weight range of aluminoborosilicate particles is about 30 to 70 weight percent of the total mixture.

* * * * *